United States Patent
Dziadosz et al.

[11] Patent Number: 5,832,222
[45] Date of Patent: Nov. 3, 1998

[54] APPARATUS FOR PROVIDING A SINGLE IMAGE OF AN I/O SUBSYSTEM IN A GEOGRAPHICALLY DISPERSED COMPUTER SYSTEM

[75] Inventors: John A. Dziadosz; Jorge D. Penaranda, both of Naperville; Dale F. Rathunde, Geneva, all of Ill.

[73] Assignee: NCR Corporation, Dayton, Ohio

[21] Appl. No.: 666,151

[22] Filed: Jun. 19, 1996

[51] Int. Cl.[6] .................................................. G06F 13/00
[52] U.S. Cl. ............................. 395/200.46; 395/200.47; 395/200.57; 395/182.04
[58] Field of Search ..................... 395/200.43, 200.46, 395/200.47, 182.04, 200.57; 711/114

[56] References Cited

U.S. PATENT DOCUMENTS

| | | | |
|---|---|---|---|
| 5,072,368 | 12/1991 | Foreman et al. | 395/575 |
| 5,155,845 | 10/1992 | Beal et al. | 395/182.04 |
| 5,212,784 | 5/1993 | Sparks | 395/575 |
| 5,261,094 | 11/1993 | Everson et al. | 395/600 |
| 5,263,154 | 11/1993 | Eastridge et al. | 395/575 |
| 5,283,868 | 2/1994 | Baker et al. | 395/200.57 |
| 5,381,545 | 1/1995 | Baker et al. | 395/575 |
| 5,404,508 | 4/1995 | Konrad et al. | 395/600 |
| 5,440,689 | 8/1995 | Reilly et al. | 395/200.46 |
| 5,446,871 | 8/1995 | Shomler et al. | 395/180 |
| 5,459,857 | 10/1995 | Ludlam et al. | 395/182.04 |
| 5,544,347 | 8/1996 | Yanai et al. | 711/162 |
| 5,598,549 | 1/1997 | Rathunde | 711/114 |
| 5,742,792 | 4/1998 | Yanai et al. | 711/162 |
| 5,757,642 | 5/1998 | Jones | 364/134 |

OTHER PUBLICATIONS

"RAID Unbound: Storage Fault Tolerance in a Distributed Environment," by Brian Ritchie, Alphatronix, Inc., Computer Technology Review, Fall/Winter 1995, pp. 100–105.

*Primary Examiner*—Alyssa H. Bowler
*Assistant Examiner*—Walter D. Davis, Jr.
*Attorney, Agent, or Firm*—Maginot, Addison & Moore

[57] ABSTRACT

A computer system having a scaleable software architecture is disclosed. The scaleable communication or data replication architecture that enables transparent replication of data or state information over a network of geographically dispersed processing units. Transparent data replication over a geographically dispersed computer network is useful in applications such as parallel computing and disaster recovery. The communication architecture also provides a transparent interface to a kernel I/O subsystem, device drivers and system applications. The communication architecture provides a distributed data model presenting a single system image of the I/O subsystem that allows two or more geographically dispersed processing units or clusters thereof, access to common data. In one particular implementation, the communication architecture permits RAID algorithms, such as RAID level 1 and RAID level 5 state information to be applied to the geographically dispersed network for site disaster recovery. The distributed data model software package may be run on uni-processor or multi-processor systems each having the same or different operating environments.

20 Claims, 7 Drawing Sheets

APPARATUS FOR PROVIDING A SINGLE IMAGE OF AN I/O SUBSYSTEM IN A GEOGRAPHICALLY DISPERSED COMPUTER SYSTEM

BACKGROUND OF THE INVENTION

The present invention relates generally to geographically dispersed computer systems, and more particularly to an apparatus for providing a single image of an I/O subsystem in a geographically dispersed computer system.

Known computer systems are typically configured with limited I/O bandwidth and disk capacity. In addition, direct I/O connectivity requirements limit clustering of computer systems to specific platform I/O technologies (e.g. SCSI, Fiber Channel etc.) as well as to the type of platforms themselves. For example, when using a shared SCSI bus, all processing nodes that are connected to the SCSI bus must not only use SCSI, but must also use the same version of SCSI. Likewise, if both processing nodes are interconnected via a Fiber Channel, then both nodes must use Fiber Channel.

The prior art, in an attempt to transcend the physical limitations of accessing common data from clustered computer systems, has attempted to expand disk capacity outside of a single box (e.g. disk drive unit). For instance, it is known to remotely access a peripheral such as a disk associated with a remote computer from a local computer. In particular, a known software product such as Remote File Sharing software (RFS) for UNIX permits a local device or node to gain access to a peripheral on another computer system. However, RFS is specialized software that tends to be unreliable and slow, and more importantly is not transparent to the local or to the remote computer system.

In addition, such prior art solutions have not resolved the problem of interconnecting different platforms or operating systems together. For instance, the present state of art does not permit a present computer system utilizing SCSI interconnect technology to be interconnected with a new computer system utilizing Fiber Channel technology. That is, the present state of art does not permit different platforms to be interconnected together at a disk level because the systems can not communicate with each other.

Further, present interconnect technologies such as SCSI have cabling requirements which impart burdensome physical spacing constraints upon the location and dispersion of clustered processing units. It should be appreciated that the greater the distance separating two given processing units, the greater the fault resilience and disaster recovery ability of the computing system.

What is needed therefore is a method and apparatus for providing a single image of an I/O subsystem in a geographically dispersed computer system by using a network to interconnect multiple computer systems so that applications running on a local processing unit can utilize disks that are associated with other nodes on different platforms. What is also needed is a method of interconnecting different platforms as well as different disk technologies together while still providing a single image of an I/O subsystem. Such a method and apparatus would permit (1) a cost-efficient hardware upgrade solution, (2) a non-disruptive growth path when upgrading computer systems, and (3) expanded computing power without disregarding current computer systems, thus leveraging existing hardware.

SUMMARY OF THE INVENTION

What is disclosed hereafter is a kernel-level communication architecture which transparently connects I/O subsystems together by communicating state information and I/O request data across a network to geographically dispersed processing units that cooperate to form a distributed computer system. Thus, the described kernel-level communication architecture operates in different operating systems to scale and expand a local node across multiple nodes.

In accordance with one embodiment of the present invention, there is provided a computer system including a first processing unit having a first storage device, a second processing unit having a second storage device, and a network connecting the first processing unit to the second processing unit. The first processing unit includes a physical device driver for transferring data to and from the first storage device, and a distributed data module for transferring a copy of the data between the first processing unit and the second storage device across the network without the knowledge of the first processing unit.

Pursuant to another embodiment of the present invention, there is provided a computer system including a first processing unit having a first storage device associated therewith, a second processing unit having a second storage device associated therewith, a network connecting the first processing unit to the second processing unit, a first physical device driver for transferring first data between the first processing unit and the first storage device, and a mechanism for transparently transferring the first data between the first processing unit and the second storage device across the network without the knowledge of the first processing unit.

Pursuant to yet another embodiment of the present invention, there is provided a computer system including a local processing unit having a first operating system executing thereon, a storage device for storing data, a physical device driver for facilitating the transfer of the data between the local processing unit and the storage device, and a distributed data module transparently interfaced to the operating system and the physical device driver for replicating the data across a network to a first remote processing unit.

It is therefore an object of the present invention to provide a new and useful method for replicating data in a computer system.

It is another object of the present invention to provide an improved method for replicating data to a number of processing units forming a geographically dispersed computer system.

It is another object of the present invention to provide a new and useful apparatus for replicating data to a number of processing units forming a geographically dispersed computer system.

It is a further object of the present invention to provide an improved apparatus for replicating data to a number of processing units forming a geographically dispersed computer system.

It is therefore an object of the present invention to provide a new and useful method for transferring state information to a number of processing units forming a geographically dispersed computer system.

It is another object of the present invention to provide an improved method for transferring state information to a number of processing units forming a geographically dispersed computer system.

It is another object of the present invention to provide a new and useful apparatus transferring state information to a number of processing units forming a geographically dispersed computer system.

It is a further object of the present invention to provide an improved apparatus for transferring state information to a number of processing units forming a geographically dispersed computer system.

The above and other objects, features, and advantages of the present invention will become apparent from the following description and the attached drawings.

DETAILED DESCRIPTION OF THE PREFERRED EMBODIMENT

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

What is described hereafter is a scaleable communication or data replication architecture that enables transparent replication of data or state information over a network of geographically dispersed processing units. Transparent data replication over a geographically dispersed computer network is useful in applications such as parallel computing and disaster recovery. The communication architecture also provides a transparent interface to a kernel I/O subsystem, device drivers and system applications. The communication architecture provides a distributed data model presenting a single system image of the I/O subsystem that allows two or more geographically dispersed processing units or clusters thereof, access to common data. In one particular implementation, the communication architecture permits RAID algorithms, such as RAID level 1 and RAID level 5 state information to be applied to the geographically dispersed network for site disaster recovery. The distributed data model software package may be run on uni-processor or multi-processor systems each having the same or different operating environments.

Figure 1:
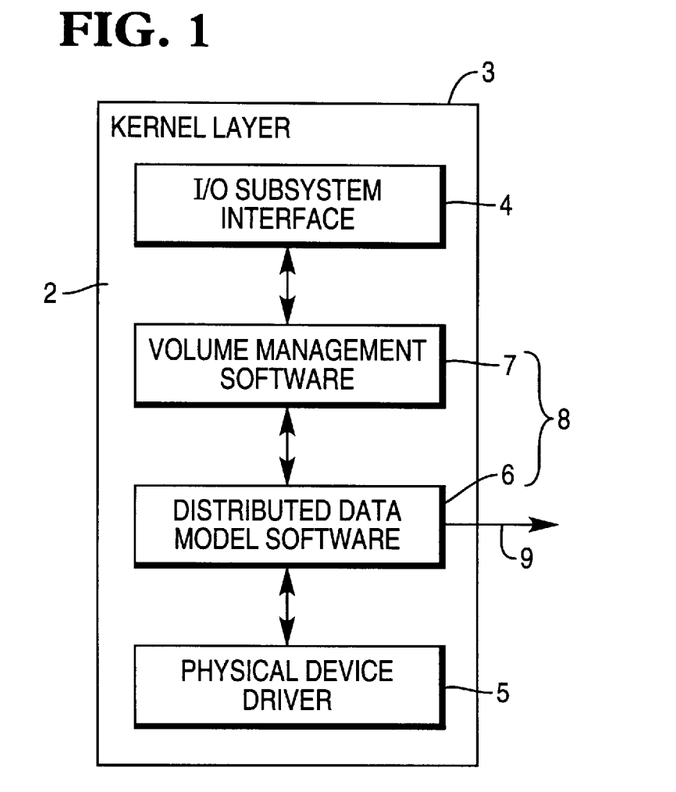
FIG. 1 is a block diagram of an operating system kernel layer of a single processing unit which incorporates the features of the present invention therein.

Referring now to FIG. 1, there is shown a block diagram of a conventional kernel layer 2 of an operating system executing within a single processing unit 3. The kernel layer 2 includes an I/O subsystem interface 4 which typically communicates with a physical device driver 5 in a conventional manner. As described in greater detail below, the distributed data model software 6 of the present invention, in conjunction with known add-on volume management software 7, resides between the I/O subsystem interface 4 and the physical device driver 5 as middleware 8.

It should be appreciated that the middleware 8 (e.g. the volume management software 7 and the distributed data model software 6) transparently interfaces with the I/O subsystem 4 such that the I/O subsystem 4 does not know that the middleware 8 is present. Likewise, the middleware 8 transparently interfaces with the physical device driver 5 such that the physical device driver 5 does not know that the middleware 8 is present.

In addition, the middleware 8 acts as a switch for data that is to be written to a local peripheral via the physical device driver 5. In particular, the middleware 8 can replicate data to, or read data from a remote peripheral on path 9 without affecting the performance of the I/O subsystem interface 4 or the physical device driver 5. In the embodiment being described, the middleware 8 resides on a host system as described further below. However, it should be appreciated that the middleware 8 may reside on a controller board such as a host adapter, or reside at a RAID subsystem level in order to replicate data in the same manner as set forth below with respect to a host system.

Figure 2:
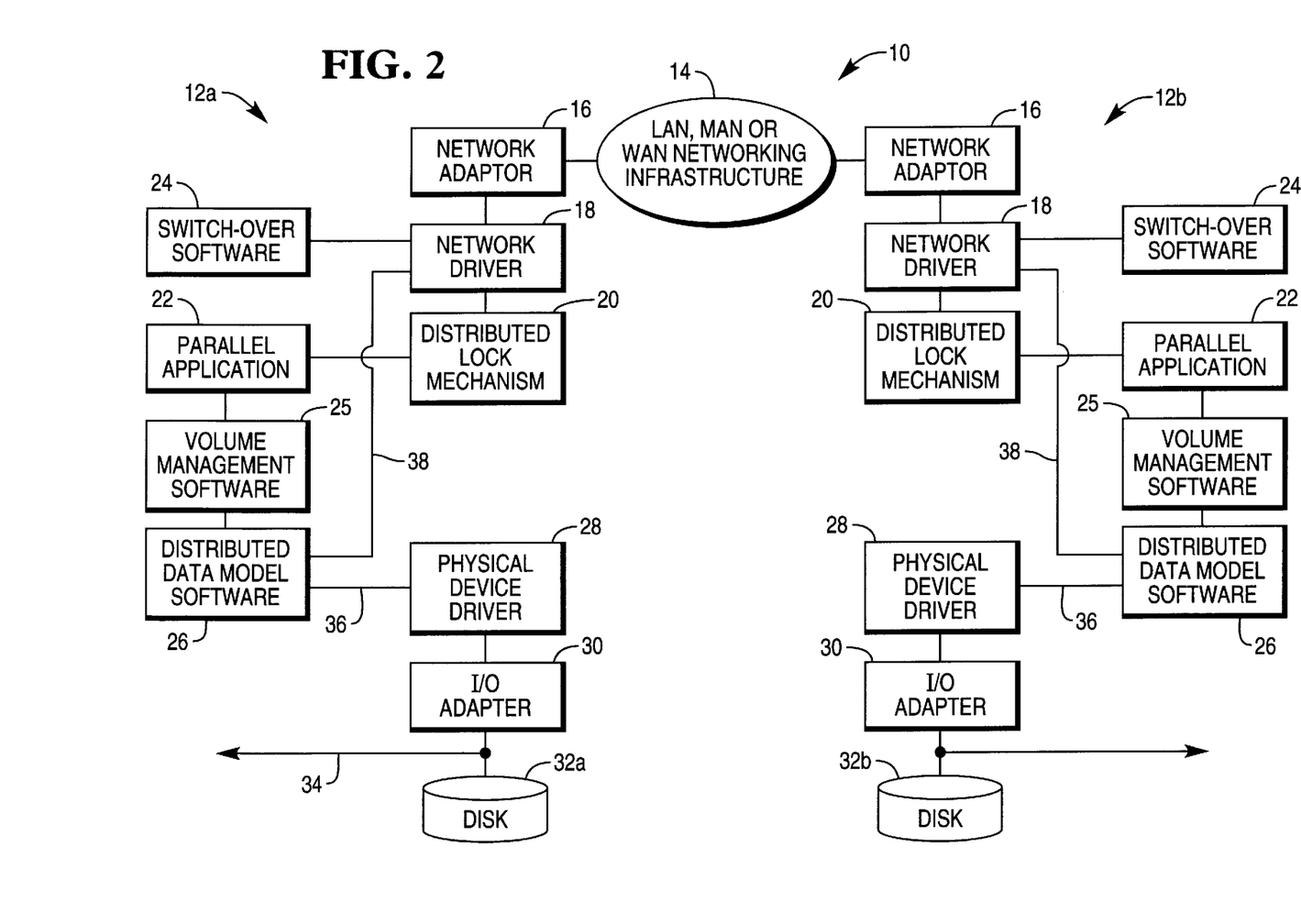
FIG. 2 is a block diagram of geographically dispersed computer system which also incorporates the features of the present invention therein.

Referring now to FIG. 2, there is shown a block diagram of multi-node computer system 10 which incorporates the features of the present invention therein. The multi-node computer system 10 includes a number of geographically dispersed processing units or nodes 12 such as host computers. Two processing units, a local processing unit 12a and a geographically remote processing unit 12b are shown in FIG. 2 to facilitate the explanation of the computer system 10. However, it should be appreciated that any number of additional local and/or remote processing units may be added to the computer system 10 without departing from the scope of the invention described hereafter.

As shown in FIG. 2, the processing units 12 are interconnected via a network infrastructure 14 such as a Local Area Network (LAN), Metropolitan Area Network (MAN) or a Wide Area Network (WAN). In addition, the network 14 may also be a bus, a hardware backplane, or a number of PC motherboards connected in a rack-mounted configuration with a physical backplane acting as a high-speed network. Further, the network 14 may be ETHERNET running on a LAN, or wireless, as long as the network path(s) can connect at least two processing units together, where each processing unit includes at least a processor (CPU), memory and a disk. Thus, a processing unit as used herein, refers to devices such as notebook computers, personal computers, servers, all the way up to massively parallel processing computers.

In particular, each processing unit 12 may include a network adapter 16, network driver 18, software distributed lock mechanism 20 associated with a parallel software application 22, switch-over software 24, known volume management software 25 (such as Disk Array PLUS or Tape Array PLUS volume management software available from AT&T), distributed data model software 26, physical device driver 28, I/O adapter 30 and a peripheral 32 such as a hard disk, optical disk, hardware RAID sub-system, or disks managed by the volume management software 25 (software RAID). It should be appreciated that the disk 32 may also be other types of peripheral such as a sequential access tape drive.

The network adapters 16 may be known expansion cards or other similar devices which conventionally connect the respective processing units 12 to the network infrastructure 14. The network drivers 18 are known network-specific control software that enable the processing units 12 to communicate over the particular network 14 in a conventional manner. In the embodiment being described, the network adapters 16 and network drivers 18 may support any conventional network protocol such as ETHERNET, ATM (Asynchronous Transfer Mode), or FDDI (Fiber Distributed Data Interface).

The I/O adapters 30 may be known expansion cards or similar devices which conventionally connect the processing units 12 to their respective disks 32 via buses 34 such as a SCSI bus or a Fibre Channel bus. The physical device drivers 28 are a known device-specific control software that enables the processing units 12 to read/write information from/to the respective disks 32 in a conventional manner. In the embodiment being described, the I/O adapters 30 and physical device drivers 28 may support any conventional I/O protocol such as SCSI or Fibre Channel. It should be appreciated that additional processing units (not shown) may be connected to each disk 32 across the bus 34 to form a cluster configuration.

The known switch-over software 24 typically resides on a processing unit 12 that is operating in a standby mode (such as processing unit 12b), and monitors an application program that is executing on a processing unit 12 that is operating in an active mode (such as processing unit 12a). If the active processing unit 12a fails in some respect, the switch-over software 24 on the standby processing unit 12b detects such failure on active processing unit 12a and starts up the standby processing unit 12b to pick-up execution of the application program where the failed processing unit 12a left off.

In the embodiment being described, the switch-over software 24 executing on local processing unit 12a may monitor the operational status of remote processing unit 12b across the network 14 to insure that processing unit 12b remains powered up. Likewise, the switch-over software 24 executing on remote processing unit 12b may monitor the operational status of local processing unit 12a across the network 14 to insure that processing unit 12a remains powered up. The switch-over software 24 monitors the respective processing units 12 by a conventional heartbeat mechanism that is transmitted and received across the network 14. A suitable switch-over software package is the LifeKeeper software package available from AT&T.

The switch-over software 24, when used in conjunction with the distributed data model software 26, provides the capability of (1) detecting when a geographically dispersed processing unit has failed in some respect, and (2) mounting a copy of the software application that was executing on the failed processing unit, onto the resident processing unit to pick up processing of the data where the failed processing unit left off. As described further below, execution of the software application on the resident processing unit is possible because of the fact that the distributed data model software 26 transparently (e.g. without the knowledge of the failed processing unit) and asynchronously replicates data from the failed processing unit to the resident processing unit in the same order written to the failed processing unit, before the failed processing unit fails.

By way of example, if the switch-over software 24 resident on the remote processing unit 12b detects that the local processing unit 12a has failed in some respect, such as the processing unit 12a fails to respond to queries across the network 14, then the switch-over software 24 resident on processing unit 12b will mount the software application that was previously executing on processing unit 12a, onto processing unit 12b. Once the software application is mounted on processing unit 12b, processing of the same data can begin again because the data was previously automatically replicated across the network 14 from the disk 32a of processing unit 12a to the disk 32b of processing unit 12b by the distributed data model software 26 as described further below. The distributed data model software 26 replicates the data from the disk 32a to disk 32b in the same order as the data is written to disk 32a.

Thus, in a switch-over application, one processing unit 12 runs an application while the other processing unit 12 is updated or otherwise has data replicated thereto. In particular, a distributed data configuration consists of two pieces or disks, the local piece being the disk 32 of the processing unit 12a and the remote piece being the disk 32 of the processing unit 12b.

When an application runs on processing unit 12a, the data is duplicated to the disk 32b of the remote processing unit 12b. If a situation occurs where the application running on processing unit 12a fails or is otherwise interrupted, then the processing unit 12b boots up a copy of the application on disk 32b, and the disks 32 comprising the distributed mirror reverse roles. That is, the local piece of the distributed data configuration becomes disk 32b and the remote piece of the distributed data configuration becomes 32a.

The parallel software applications 22 may be any known software package that simultaneously executes on multiple processing units 12. The parallel applications 22 typically utilize known distributed lock mechanisms 20 in a conventional manner to prevent the processing units 12 from simultaneously writing to the same block of data that is replicated on the respective disks 32 to prevent the data from being corrupted. In the embodiment being described, the parallel application 22 may be a cluster database product such as Oracle Parallel Server (OPS) which provides the ability to share a single database image across multiple nodes, or may be a cluster file system that provides the ability to share a single file system image across multiple nodes.

The parallel software application 22, when used in conjunction with the distributed data model software 26, provides a single system data image to the geographically dispersed processing units 12 of the computer system 10. That is, the parallel software applications execute simultaneously on processing units 12. The distributed data model software 26 permits data that is written to the disk 32 of the local processing unit 12a to be automatically replicated the disk 32 of one or more remote processing units 12.

Likewise, the distributed data model software 26 permits data that is written to the disk 32 of the remote processing unit 12b to be automatically replicated to the disk 32 of the local processing unit 12a. Thus, the distributed data model software 26 permits the processing units 12 to have a single system image of I/O subsystem (e.g. a signal system image of the data on the disks 32) even though the processing units 12 are geographically separated.

The distributed data model software 26 utilizes a conventional I/O path 36 (FIG. 2) for facilitating I/O transfers (e.g.

I/O reads and writes) to the local disk 32. In addition, the distributed data model software 26 includes a second I/O path 38 for facilitating the transparent (e.g. without the knowledge of the local processing unit 12) replication of data bound for a local disk 32, across the network 14 to a remote disk associated with a remote processing unit as described further below.

Thus, in a parallel application, both processing units 12 run an application at the same time on a shared distributed data configuration. In the shared distributed data configuration, the processing unit 12a has the disk 32a configured as the local piece and the disk 32b configured as the remote piece of the distributed shared data configuration. Simultaneously, the processing unit 12b has disk 32a configured as the remote piece and the disk 32b configured as the local piece of the distributed shared data configuration. In parallel applications, the processing units 12a, 12b utilize synchronous data replication when writing data to the disks 32a, 32b.

Figure 3:
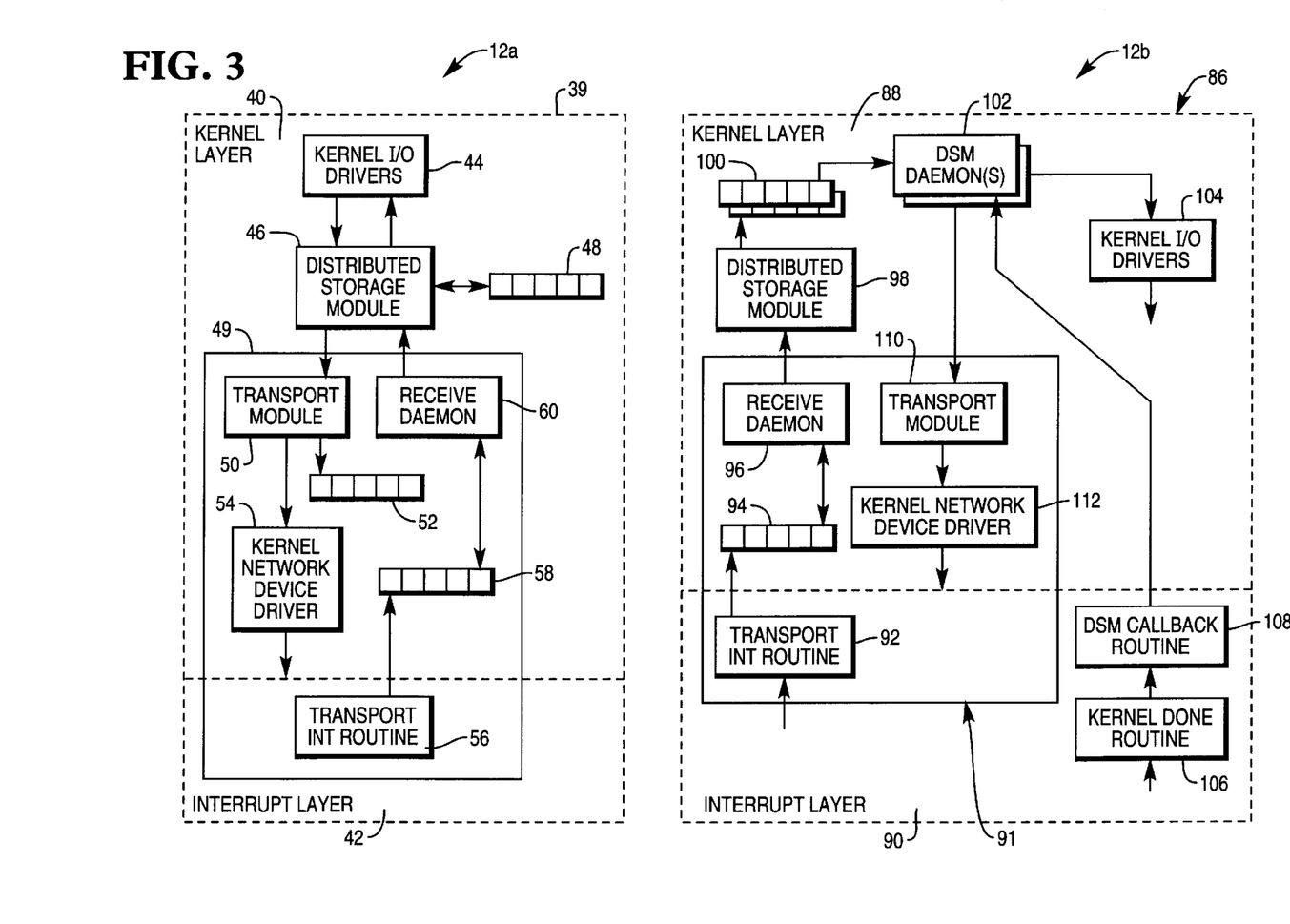
FIG. 3 is a block diagram of a communication architecture for permitting transparent data replication between a local processing unit and one or more geographically remote processing units of the computer system shown in FIG. 2.

Referring now to FIG. 3, there is shown an architecture 39 of the distributed data model software 26 that is resident on processing unit 12a, and an architecture 86 of the distributed data model software 26 that is resident on the processing unit 12b. In particular, the architectures 39, 86 shown in FIG. 3 and described in detail hereafter, facilitate the transparent replication of data along the second I/O path 38 (FIG. 2) from a local processing unit 12a to a sequential access device (e.g. tape drive) or a random access device (e.g. hard disk, optical disk, hardware RAID subsystem, software RAID) associated with one or more remote processing units 12b.

In addition, the architectures 39, 86 shown in FIG. 3 and described in detail hereafter, facilitate sending state information along the second I/O path 38 from the local processing unit 12a to one or more remote processing units 12b. Note that the architecture 39 also facilitates transferring I/O requests (e.g., I/O reads and writes) between the local processing unit 12a and the local disk 32 along the conventional I/O path 36 in a manner well known to one of ordinary skill in the art. Thus, further discussion thereof is not warranted.

Each processing unit 12a, 12b includes an operating system having a known kernel layer 40 (FIG. 3). It should be appreciated that the kernel layer 40 defines the core of the operating system, i.e. that portion of the operating system that manages memory, files and peripheral devices; maintains time and date; launches applications; and allocates system resources. In addition, each operating system includes a known interrupt layer 42 that resides at a level above the kernel layer 40.

The architecture 39 for the local processing unit 12a includes a number of routines that reside in the kernel layer 40 and reside in the interrupt layer 42 of the operating system. In particular, the architecture 39 for the local processing unit 12a includes one or more kernel I/O drivers 44, a distributed storage software module 46, and one or more outstanding request queues 48 all of which reside in the kernel layer 40. The architecture 39 also includes a communication infrastructure 49 comprising a transport module 50, a transmit queue 52, a network device driver 54, a receive queue 58 and a receive daemon process 60 which reside in the kernel layer 40, and a transport interrupt routine 56 which resides in the interrupt layer.

It should be appreciated that the communication infrastructure 49 may be any known communication infrastructure which complies with the known ISO/OSI (International Organization for Standardization Open Systems Interconnection) model. That is, the communication infrastructure 49 of the present invention is modeled after the ISO reference model where the distributed storage module 46 logically comprises the function of the presentation and session layers of the ISO model that reside above the communication infrastructure 49.

Commercially available or proprietary networking protocol software implementations may provide the communication infrastructure 49 such as TCP/IP over ETHERNET, X.25, FDDI, ATM, or preferably, the Reliable Transport Module (RTM) product available from AT&T. In addition, the interconnection of the distributed storage module 46 and a commercially-available communication infrastructure 49 may be described by the TSI (Transport Service Interface). The TSI standard defines a set of primitives or messages such as SEND_TPDU and RECEIVE_TPDU that send and receive packets.

Referring again to FIG. 3, the architecture 39 is layered into three tiers. The first tier includes the distributed storage module 46 which encapsulates I/O data or state information as described further below. The second tier includes the transport module 50 which encapsulates the I/O data or state information for transmission across the network 14 in accordance with a protocol defined by the third tier of the architecture 39. The third tier includes the kernel network device driver 54 which provides a low level communication routing protocol such as Internal Protocol (IP) between the geographically dispersed processing units 12 across the network 14.

It should be appreciated that the third tier may implement other protocols, such as a protocol defined by a microkernel as part of a microkernel communication service to other nodes or processing units running the same microkernel. In addition, the third tier may be implemented as a hardware backplane with a chip set that provides the communication services.

Figure 4:
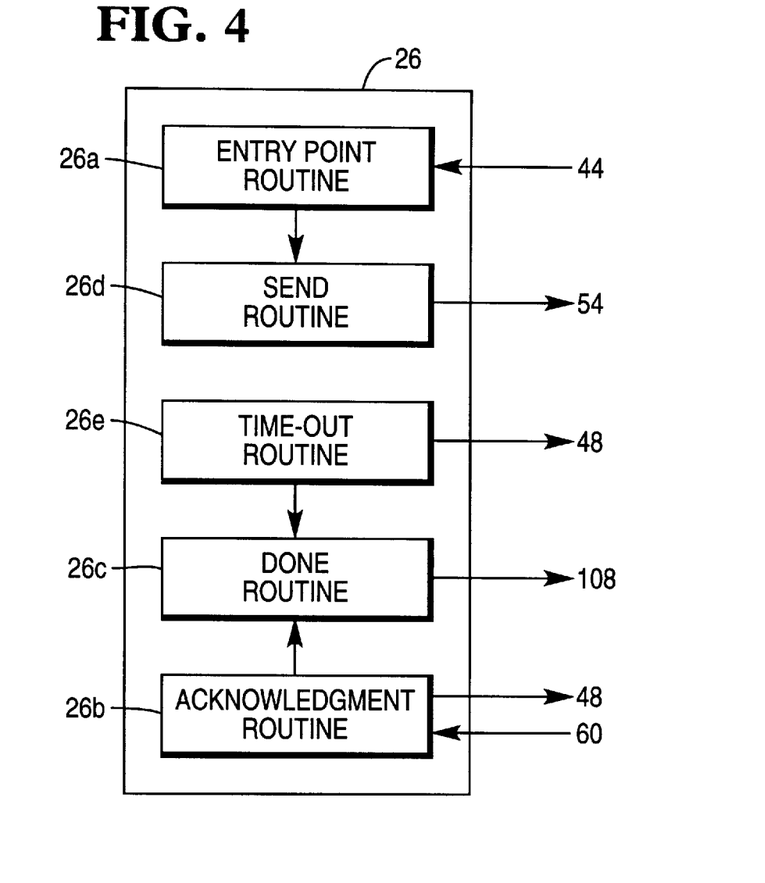
FIG. 4 is a block diagram of a distributed data model software module which forms a portion of the communication architecture shown in FIG. 1.

The distributed storage module 46 and the communication infrastructure 49 cooperate to form the distributed data model software 26 (FIG. 2). As shown in FIG. 4 and described in detail below, the distributed data model software 26 includes a number of subroutines, namely an entry point routine 26a, an acknowledge routine 26b, an done routine 26c, a send routine 26d, and a time out routine 26e. It should be appreciated that the distributed storage module 46 and communication infrastructure 49 are also resident on the remote processing unit 12b. In addition, it should be appreciated that some of the subroutines mentioned above are executed on a local processing unit and other subroutines are executed on a remote processing unit as described further below.

Figure 5:
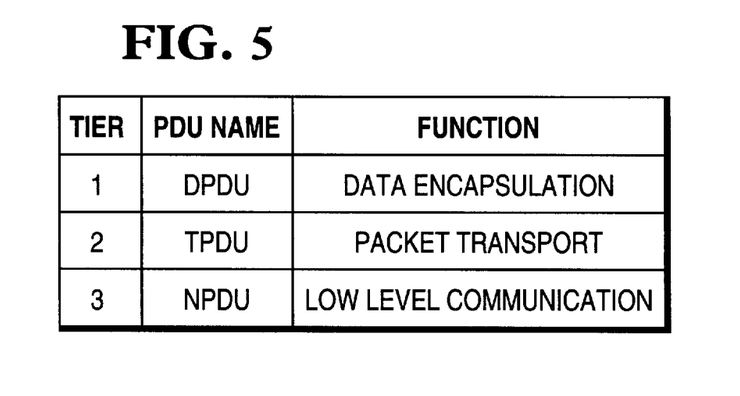
FIG. 5 is a chart showing the different layers or tiers that form the communication architecture shown in FIG. 3, along with the name and function of the data structure associated with each layer.

Data that is to be conveyed or transmitted between the processing units 12 is encapsulated into a data structure such as a Protocol Data Unit (PDU). As shown in FIG. 5, a PDU is defined for each of the three tiers forming the communication architecture 39. More specifically, the PDU defined for the first tier is a Data PDU or DPDU. The PDU defined for the second tier is a Transport PDU or a TPDU. The PDU defined for the third tier is a Network PDU or a NPDU.

It should be appreciated that the PDUs may encapsulate application data as well as state information such as synchronization data. One example of state information that may be sent across the network 14 is RAID level 1 or RAID level 5 state information such as disk Out-Of-Service (OSS), disk In-Service (IS) or disk parity (Out-Of-Date) information. It should also be appreciated that by permitting state information to be transferred between processing units 12, a single system image of an I/O subsystem of the computer system 10 can be achieved. A single system image of an I/O subsystem permits geographically dispersed processing units to access common data.

Figure 6:
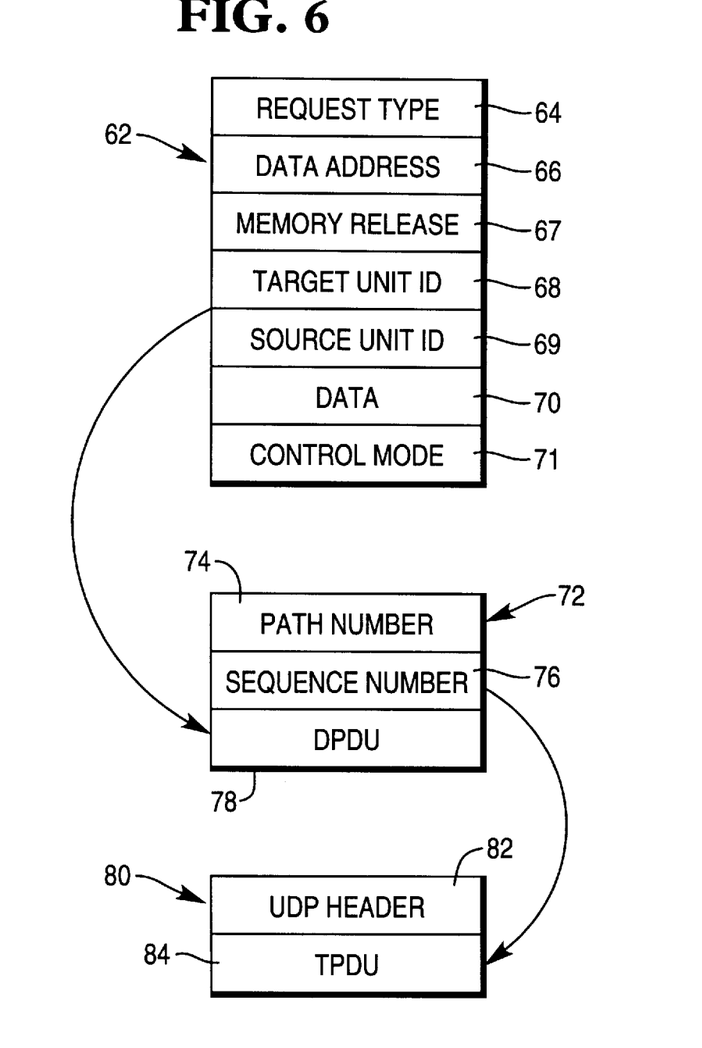
FIG. 6 is a block diagram showing a number of data structures for use in the communication architecture shown in FIG. 3.

Referring now to FIG. 6, a DPDU data structure 62 includes a number of fields such as a request type field 64. The request type field 64 identifies whether state information or I/O data is to be transferred to the remote processing unit 12. If state information is to be broadcast to the processing unit 12b, the field 64 may identify a set or a clear state information operation. If I/O data is to be transferred to the remote processing unit 12b, the field 64 identifies either a read I/O or write I/O request.

The DPDU data structure 62 may also include (1) a data address field 66 which links the completion of the request on the remote processing unit 12b to the original request from the kernel, e.g. I/O request, (2) a memory release field 67 which, when set, instructs the transport module 50 to release the memory reserved for the DPDU 62 once the packet is successfully sent to the target processing unit 12b, (3) a target processing unit identification field 68 which identifies which processing unit that the request should be directed to, (4) a source processing unit identification field 69 which identifies which processing unit that the request was sent from, and (5) a data field 70 which contains the data and/or state information to be sent or broadcast to the target processing unit(s) 12 in the computer system 10. The DPDU data structure 62 may also include a control mode field 71 which is active only when the TPDU data field 70 contains state information as indicated by the request type field 64.

The control mode field 71 of the DPDU 62 indicates whether the distributed storage module 46 will or will not wait (user selectable) for the target processing unit(s) 12b to acknowledge a TPDU 72 before resuming operation. That is, if the control mode field 71 so indicates, the distributed storage module 46 will go to sleep and wait for a return acknowledgment from the processing unit 12b before proceeding. If so, the transport module 50 must wake-up the distributed storage module 46 once the acknowledgment is received.

A TPDU data structure 72 includes a path number field 74 which identifies the preferred network path for communicating the packet to the remote processing unit(s) 12b, a sequence number field 76 which guarantees the processing order of the requests by the remote processing unit 12b, and a DPDU field 78 which encapsulates the DPDU data structure 62.

The architecture 39 of the present invention does not define a low-level communication driver encapsulation structure. However, a known encapsulation protocol, such as the Universal Datagram Protocol (UDP), may be used to define a NPDU data structure 80. The NPDU data structure 80 includes a conventional UDP header field 82 and a TPDU field 84 which encapsulates the TPDU data structure 72. It should be appreciated that the NPDU data structure 80 is then communicated across the network in accordance with the characteristics of the particular low-level communication driver being used.

Referring now back to FIG. 3, the known kernel I/O driver(s) 44 pass conventional data blocks to the distributed storage module 46. By conventional, it is meant that the kernel I/O driver(s) 44 pass to the distributed storage module 46, buffer headers that would normally be passed from the operating system to the physical device driver 28 were it not for the presence of the distributed data model software 46.

The buffer header typically contains information such as the block number on the remote disk 32 needed for an I/O request. The kernel I/O driver(s) 44 also write to the local disk 32 along the conventional path 36 (FIG. 1) as previously described. The kernel I/O driver(s) 44 may be provided as part of the operating system of the computer system 10, or may provided as part of an add-on volume management software package such as Disk Array PLUS or Tape Array PLUS volume management software available from AT&T.

After the kernel I/O driver(s) 44 pass the buffer header to the distributed storage module 46, the entry point routine 26a (FIG. 4) of the distributed data model software 26 allocates and initializes a buffer (not shown) from a pool of available memory (not shown). The buffer is used for building the DPDU 62. Preferably, the volume management software may allocate the buffer for the DPDU 62, which buffer should be large enough to accommodate the encapsulation requirements of the TPDU 72 and the NPDU 80 (this is the case for sending state change information to the remote processing unit). The initialization of the DPDU 62 by the entry point routine 26a includes the tasks of: (1) indicating if the request is an I/O read or write request, or a set or clear state information request; (2) placing the address of the buffer header that is passed from the kernel I/O driver(s) 44 onto the outstanding request queue 48 for use in completing the particular request as described further below; and (3) identifying the remote processing unit 12b to receive the request.

With regard to the third initialization step above, the distributed storage module 46 may replicate or broadcast to one or more remote geographically dispersed target processing units 12b. The transport module 50 encapsulates the DPDU 62 into a TPDU 78 and facilitates sending the TPDU 78 across the network 14 to the target remote processing unit 12b.

In addition to initializing the DPDU 62, the entry point routine 26a provides system I/O flow-control by monitoring the outstanding requests on the outstanding request queue 48 to see if a predetermined system threshold has been met. More specifically, there is a threshold on the amount of memory that can be allocated for DPDUs 62. If too many DPDUs 62 are outstanding, then it is possible that threshold may be reached. In order to avoid reaching the threshold, the entry point routine 26a governs the rate of allocation of DPDUs 62 by maintaining an ordered work list, keeping track of the number of outstanding requests, and deciding if the requests can be sent to the remote site.

The distributed storage module 46 passes the DPDU 62 to the send routine 26d for encapsulation into the DPDU field 78 of TPDU 72. The send routine 26d also encodes the second tier encapsulation information into the header of the TPDU 72. This includes encoding a sequence number into the sequence number field 76 of the TPDU 72 so that the packet (e.g. TPDU) is delivered to the remote site, in order, on the path specified in the path number field 74 of the TPDU 72. The TPDU 72 is then placed on the transmit queue 52 for use in subsequent retransmissions of the TPDU 72, if necessary. That is, the transmit queue 52 is used by the transport module 50 to guarantee the sequence that packets are send across the network 14.

The transport module 50 also passes the TPDU 72 to the kernel network device driver 54 via system interfaces to transmit the TPDU 72 to the remote processing unit 12b. The kernel network device driver 54 encapsulates the TPDU 72 into the TPDU field 84 of the NPDU 80 which is then conveyed to the remote processing unit 12b using the protocol and methods defined by the known low-level communication driver (e.g. UDP). The low-level communication driver sends the NPDU packet 80 over the network 14 independent of the distributed data model software 26.

The transport module 50 receives TPDU packets 72 from the remote processing unit 12b. The incoming TPDU packets 72 may contain acknowledgment information regarding a previous TPDU packet 72 sent to the remote processing unit 12b, or may contain data to be replicated onto the local disk 32 from the remote processing unit 12b during an active-active mode of operation. The transport interrupt routine 56 is called by a network device interrupt routine or low-level communication driver interrupt routine (not shown) when an incoming packet is received. The transport interrupt routine 56 places the incoming TPDU 72 on the receive queue 58 ordered according to the assigned sequence number stored in the sequence number field 76 of each TPDU 72. The lowest sequence numbered TPDU packet 72 is placed at the front of the receive queue 58, and the highest numbered TPDU packet 72 is placed at the rear of the receive queue 58.

Once the acknowledgment from the processing unit 12b is received by the processing unit 12a, the transport module 50 will release the memory reserved for the DPDU 62 if the job request field 64 indicates that data was sent to the processing unit 12b, as opposed to state information, and if the memory release field 67 is set.

The receive daemon 60 is responsible for servicing the receive queue 58. What is meant herein by the use of the term "daemon" is a program or process that performs a housekeeping or maintenance function without being requested or even known of by the user. Typically a daemon routine sits in the background and is called into play only when needed.

Whenever a new incoming TPDU 72 is added to the receive queue 58, the receive daemon 60 checks to see if the TPDU 72 at the front of the receive queue 58 contains the next unprocessed sequence number. If it does, the TPDU 72 is removed from the receive queue 58 and is passed to the distributed storage module 46. This process iterates until the receive queue 58 is empty, or until the sequence number of the TPDU 72 at the front of the receive queue 58 is not the next expected sequence number. The receive daemon 60 is responsible for validating the TPDU 72, including checking for duplicate sequence numbers.

The distributed storage module 46 handles acknowledgments. The acknowledgment routine 26b (FIG. 5) is called by the receive daemon 60 when requests return from the remote processing unit 12b. The acknowledgment routine 26b removes the relevant buffer header from the outstanding request queue 48. The distributed storage module 46 obtains status information from the TPDU 72 regarding the pending request and sets any error fields, if necessary, in the buffer. The distributed storage module 46 obtains the address of the buffer from the received TPDU 72 and passes the address to the done routine 26c.

The done routine 26c wakes up any sleeping requests on the threshold and adjusts the outstanding I/O counters for purposes of flow control in a manner known to one of ordinary skill in the art. The done routine 26c then passes the buffer address to a conventional kernel I/O routine (not shown) or to a virtual I/O done routine (not shown) associated with volume management software if installed, which places the buffer on the appropriate I/O queue for use by the kernel I/O drivers 44 to signal to the operating system that the outstanding request has completed (either successfully or unsuccessfully).

The time-out routine 26e (FIG. 5) is initialized when the first remote I/O operation is performed on a configured remote device (i.e. replicating data to the disk of the remote processing unit 12b). At pre-determined specified intervals, the time-out routine 26e checks the DPDUs 62 on the outstanding request queue 48. DPDU packets 62 found that exceed the allotted time to complete will have their error fields (not shown) set in the buffer and be removed from the outstanding request queue 48. The failed buffer will then be passed to the done routine 26c. In addition, an appropriate error may be displayed on a console.

The search algorithm for the time-out routine 26e will be to look at a predetermined number of buffers at the front of the outstanding request queue 48, and mark them. These are the buffers that have been on the outstanding request queue 48 the longest. If the buffers are found on the list a second time then a time-out condition occurs and the time-out routine 26e takes the actions described above. It should be appreciated that other search algorithms can be implemented.

Returning again to FIG. 3, the architecture 86 for the remote processing unit 12b includes a number of routines that reside in a kernel layer 88 and in an interrupt layer 90 of the operating system. In particular, the architecture 86 for the remote processing unit 12b includes a communication infrastructure 91 comprising a transport interrupt routine 92 that resides in the interrupt layer 90, and a receive queue 94, a receive daemon 96, a transport module 110 and a kernel network device driver 112 that reside in the kernel layer 88. The architecture 86 also includes a distributed storage module 98, one or more I/O queues 100, one or more I/O daemons 102, and one or more kernel I/O drivers 104 that reside in the kernel layer 90, and a kernel done routine 106 and a DSM callback routine 108 that both reside in the interrupt layer 88. As with the communication infrastructure 49, the communication infrastructure 91 may be any known communication infrastructure which complies with the known ISO/OSI (International Organization for Standardization Open Systems Interconnection) model.

The transport interrupt routine 92 is called by a network device interrupt routine or low-level communication driver interrupt routine (not shown) when an incoming packet is received. The transport interrupt routine 92 places the incoming TPDU 72 on the receive queue 94 ordered according to the assigned sequence number stored in the sequence number field 76 of each TPDU 72. The lowest sequence numbered TPDU packet 72 is placed at the front of the receive queue 94, and the highest numbered TPDU packet 72 is placed at the rear of the receive queue 94.

The receive daemon 96 is responsible for servicing the receive queue 94. Whenever a new TPDU is added to the receive queue 94, the receive daemon 96 checks to see if the TPDU 72 at the front of the receive queue 94 contains the next unprocessed and expected sequence number. If it does, the TPDU 72 is removed from the receive queue 94 and passed to the distributed storage module 98. This process iterates until the receive queue 94 is empty, or until the sequence number of the TPDU 72 at the front of the receive queue 94 is not the next expected sequence number. If the sequence number of the TPDU 72 is not the next expected sequence number, then the receive daemon 96 waits until the next expected TPDU 72 is received. The receive daemon 96 is responsible for validating (e.g. checking for errors) the TPDU, including checking for duplicate sequence numbers.

The distributed storage module 98 receives incoming DPDUs 62 from the receive daemon 96. Alternatively, the distributed storage module 98 may receive incoming data primitives from other commercially available communication infrastructure products. The distributed storage module 98 validates the request in the processing unit 12b. In particular, if an I/O request was received, the distributed storage module 98 checks to see if the target disk or volume is valid and configured in a data access state. In addition, the distributed storage module 98 checks the source processing unit identification field 69 of the received DPDU 62 to verify that the DPDU 62 was received from the expected processing unit 12a.

That is, once a processing unit 12a establishes a distributed configuration with a particular processing unit 12b, the processing unit 12b expects to receive DPDUs only from the processing unit 12a that established the particular configuration. Until the particular configuration is closed, the processing unit 12b will invalidate any DPDUs received from processing units other than the processing unit which initiated that configuration.

Once preliminary validation of the received DPDU 62 has been completed, the entry point routine 26a allocates a system buffer or control structure and initializes the buffer to include the DSM callback routine 108, and include all other information from the DPDU 62 to complete the remote request. The DSM callback routine 108 permits the distributed storage module 98 to be notified by a virtual software management layer (when performing I/O to a virtual disk) or a physical device driver (when performing disk I/O) when the remote request is completed.

The buffer is then inserted onto the I/O queue 100 in sequence. The I/O daemon(s) 102 is awakened if not running, to process the buffer on the I/O queue 100. The I/O daemon(s) 102 passes the buffer to the kernel I/O drivers 104. It should be appreciated that there is one I/O queue 100 and one I/O daemon 102 associated with each processor (not shown) in the processing unit 12b in order to provide a multi-threaded environment (simultaneous execution of the processors) for improving performance and maximizing bandwidth and balancing the workload of each of the processors.

As previously mentioned, the kernel I/O drivers 104 may be add-on volume management software such as Disk Array PLUS or Tape Array PLUS volume management software provided by AT&T. For I/O requests, the kernel I/O drivers 104 translate the I/O request into a conventional physical I/O request for use in reading or writing to the peripheral associated with the remote processing unit 12b. That is, the physical I/O request is then serviced by the physical device driver 28 (FIG. 1) which reads/writes from a particular block on the disk 32 in a conventional manner.

The I/O Daemon(s) 102 is started at boot time by the distributed data model software 26, or during the initialization of the kernel 88 or initialization of start-up scripts (kernel routines or application programs that run as part of the startup sequence). In the embodiment being described, the I/O Daemon(s) 102 may be a number of kernel processes in order to maximize performance. That is, a number of kernel processes can service the requests (data or state information) on the I/O queue 100 faster than a single kernel process. Thus, the I/O daemon(s) 102 waits for requests to be placed on the I/O queue 100. Once awakened, the I/O daemon 102 passes the request to the kernel I/O driver 104 until the I/O queue 100 is empty or until interrupted by a tunable preemption mechanism. Since the distributed data model software 26 runs as part of the kernel layer 40 rather than being scheduled as an application, the software 26 includes a tunable preemption mechanism to preempt itself so as to not monopolize a CPU within the processing unit 12.

At the interrupt level 90, when a physical I/O request completes, the kernel done routine 106, calls the DSM callback routine 108. The DSM callback routine 108 may also be called by a volume management software routine (not shown) using standard kernel callback conventions if the volume management software is resident on the computer system 10. In the later case, the volume management software routine will be called by the kernel done routine 106 when the physical I/O request completes. Thus, the DSM callback routine 108 is invoked when all requests have been completed on the remote processing unit 12b for the particular remote request. The DSM callback routine 108 marks the completed remote request in the corresponding buffer that is on one of the I/O queue(s) 100 and notifies the I/O daemon(s) 102.

The I/O daemon(s) 102 monitors the outstanding requests on the I/O queue(s) 100 and attempts to group acknowledgments of request completions. In addition, the I/O daemon(s) 102 detaches the buffer from a I/O request queue 100 and marks either pass or fail within the returning DPDU 62 from the buffer information. The I/O daemon(s) 102 then passes the DPDU to the transport driver 110 to return to the local processing unit 12a.

The transport driver 110 encapsulates the DPDU into a format (e.g. UDP) that is accepted by the kernel network device driver 112 which is a low-level communications driver. The kernel network device driver 112 is responsible for conveyance of the NPDU 80 to the local processing unit 12a across the network 14.

Figure 7:
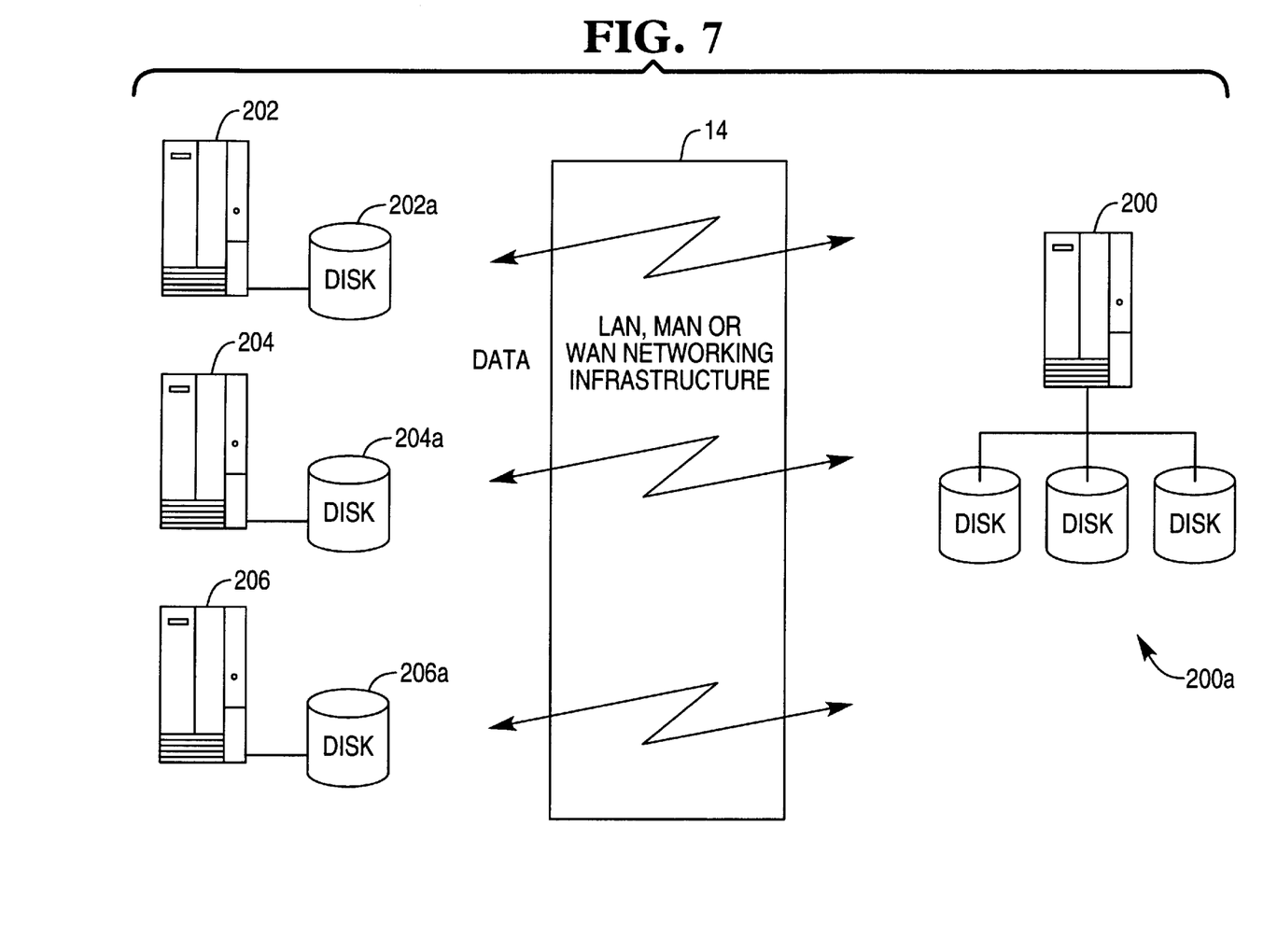
FIG. 7 is a block diagram showing the distributed data model software of the present invention being used in a backup/restore application across a network such as a local area network or a wide area network.

FIG. 7 is a block diagram showing the distributed data model software 26 of the present invention being used in a backup/restore application across a network. In particular, a server 200 may be used as a backup server for a plurality of processing units or systems 202, 204 and 206 when the distributed data model software 26 of the present invention is present on the server 200 and processing units 202, 204, 206.

The processing units 202–206 may use a distributed virtual disk wherein data is replicated to the backup server 200. The distributed virtual disk includes a primary or local piece comprising disks 202a, 204a and 206a, and a secondary piece comprising disks 200a. During normal hours of operation, the distributed virtual disk operates such that all I/O requests are directed only to the primary or local piece 202a, 204a, 206a of the distributed virtual disk.

At a typical off peak hour of the day, an administrative command to restore the distributed virtual disk may be performed wherein the secondary piece 200a of the distributed virtual disk is synchronized with the primary piece 202a, 204a and 206a. That is, the secondary piece 200a is updated so that the data stored thereon is identical to the data stored on the primary piece 202a, 204a and 206a. Once the restore operation is completed, the distributed virtual disk is again configured with the secondary piece 200a marked as being out-of-service (OSS) so that all requests are again directed to the primary piece 202a, 204a and 206a.

Thus, the application shown in FIG. 7 provides for a copy of the data to be available at a centralized server 200 with the data being as accurate as of the last restore operation. If the data is to be backed up to tape as well, then backup operations to a tape can be done on the backup server 200 with no impact to the users or applications running on the processing units 202–206, even if the tape backup is performed during peak hours of the day. Alternatively, the server 200 may run an application locally, and may need to update identical databases resident on each of the remote processing units 202–206. As such, the server 200 could operate in a branch office and replicate information to the processing units 202–206 in remote branch offices in the same manner as discussed above.

Figure 8:
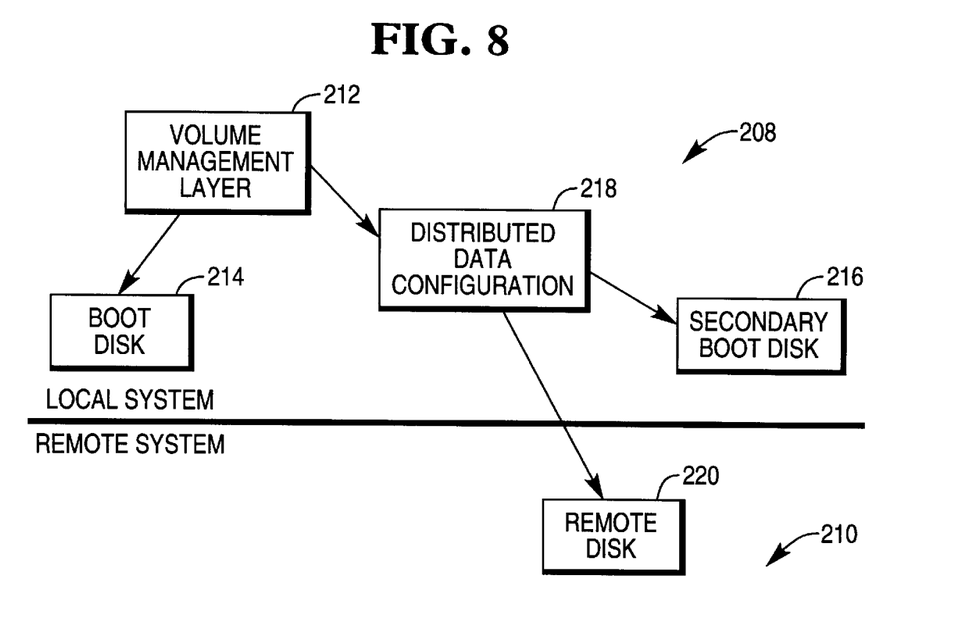
FIG. 8 is a block diagram showing the distributed data model software of the present invention being used for mirroring a boot device across a network such as a local area network or a wide area network.

FIG. 8 is a block diagram showing the distributed data model software of the present invention being used for replicating a boot device across a network. In particular, the communication architecture provides the capability to replicate the /root, /usr, /var, and /stand files of a local system 208 to a remote system 210 (along with data files on other disks of the local system 208) when the distributed data model software 26 of the present invention is present on both systems. In particular, the local system 208 includes a known volume management software layer or product 212, and two disks, namely, a boot disk 214 and a secondary boot disk 216. The secondary boot disk 216 stores a copy of the boot disk 214 locally. It is known in the art to use the volume management product 212 to mirror a copy of the boot disk 214 to the secondary boot disk 216.

The local system 208 also includes a distributed data configuration software layer or product 218 inserted below the local volume management layer 212. It should be appreciated that the distributed data configuration product 218 may represent the distributed data model software 26 of the present invention. In this configuration, the distributed data configuration product 218 transparently (without impacting or intruding on operating system software or the volume management software) mirrors the /root, /usr, /var, and /stand files not only to the secondary boot disk 216 but also to a remote disk 220 associated with the remote system 210. Thus, if the local system 208 fails, such as due to a catastrophe, the remote system 210 can be booted-up from the remote disk 220 which is a copy of the boot disk 214 of the local system 208.

When the remote system 210 comes up, it is using the local system's configuration and data, and the remote system 210 boots up the image that was being executed on the local system 208. That is, the remote system 210 boots up as if it were the local system 208. Since the remote system 210 has all of the local system's data disks and program disks, the applications which were running on the local system 208 can be restarted on the remote system 210 without having any knowledge that they are now on a different system. It should be appreciated that the boot disk 214, secondary boot disk 216 and remote disk 210 may be a hard disks, optical disks, hardware RAID sub-systems, or software RAID sub-systems.

In summary, the distributed data model described above brings to clustered computing systems, what LEGO building blocks brought to basic building blocks. That is, before LEGO building blocks were developed, basic building blocks had no interconnect facilities and could be used only to build limited structures. LEGO building blocks, because of their simple interconnect facilities, permit unlimited building of complex structures.

Likewise, the distributed data model of the present invention, with its transparent distribution support, has a similar impact on cluster computer system designs by providing a new and useful means for linking a plurality of processing units together. Thus, applications running on processing units that do not have disks may easily interact with files on processing units that do have disks, as if the disks were local to the processing units without disks. Some processing units may provide special facilities or devices (i.e. tape drives, disk drives) that every processing unit can access as if the facilities or devices were local. This permits a collection of processing units to be unified into a single image of an I/O subsystem. Another benefit of the distributed data model is to facilitate replacing processing units with new or enhanced processing units or peripherals, such as disk drives and tape drives, to provide improved or expanded services.

Since communication between processing units is through standard message interfaces, other processing units are much less impacted by the installation process. This enables incremental or dynamic upgrades to storage as well as to the operating system.

The distributed data model may utilize a data replication capability that permits a system configuration with two disks and two disk controllers, to provide fault tolerant enabling capabilities. Typically, the two disk controllers have to be located on the same processing unit. However, the distributed data model permits replication to take place between two separate processing units connected with a LAN or WAN.

Because the distributed data model uses message-based communications, a disk driver can be on the second processing unit and yet appear as if it were local to the first processing unit. In other words, the processing unit sees the two disk controllers as if they were on the same processing unit when in fact, the disk controllers are on separate processing units. The present invention permits data mirroring to occur over two simple processing units such as personal computers with low-cost controllers instead of more expensive disk controllers utilizing expensive buses. Standard computer equipment can thus be applied to high availability applications such as switch-over applications, or parallel applications such as Oracle Parallel Server.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

For example, the described invention provides a distributed data model (data over a network) which permits a cluster of nodes or processing units to access common data over a network. The described invention permits clustering of processing units across different hardware platforms and I/O subsystems. The described invention manages multiple I/O daemons on a remote processing unit to maximize I/O throughput performance at a remote site.

The described invention permits remote I/O completion acknowledgments to be piggy-backed to minimize interconnect and system bus bandwidth utilization. The described invention synchronizes remote requests on the remote processing unit in the same order presented to the I/O subsystem on the local processing unit independent of the number of paths interconnecting the nodes or processing units.

The described invention permits continuous data service in the event of a node or processing unit failure by permitting the application to be switched over to a remote processing unit. The described invention permits two or more geographically dispersed processing units access to common or replicated data. The described invention is functionally transparent to the system and to the applications running on the system. The described invention provides synchronous and asynchronous data replication services that can be used simultaneously.

The described invention permits geographically dispersed parallel applications such as Oracle Parallel Server of Cluster File System products to run on the same common data. The described invention enables interconnect technology (e.g. SCSI, Fiber Channel, ETHERNET, FDDI, ATM, T1/T3, wireless RF) to be transparent to the application. The described invention can be implemented at the system level or on an I/O controller (host adapter) at the subsystem level. The described invention permits the transfer of system/application data as well as synchronization data (state information) to create a single system image of the I/O subsystem of a computer system. The described invention is independent of the transport protocol used.

The network 14 has been generically used above to refer to anything from a bus, to a hardware backplane, to a plurality of PC motherboards connected in a rack-mounted configuration with a physical backplane acting as a high-speed network, to ETHERNET running in a LAN, to a WAN, and to wireless, as long as the network path can connect two processing units, each consisting of a CPU, memory and a disk, together. Thus, a processing unit as used above refers to devices such as notebook computers, personal computers, all the way up to massively parallel processing computers.

In addition, hardware vendors have focused on developing chipsets for doing symmetric multiprocessing (SMP). The distributed data model of the present invention may be used to interconnect commodity nodes such as standard four-processor SMP boxes or nodes together to build an array or cluster of SMP boxes. That is, the distributed data model of the present invention may be used to interconnect a number of commodity level processing elements together into one large SMP such that all commodity level processing elements would have the same view of the I/O subsystem.

What is claimed is:

1. A computer system including a first processing unit having a first storage device, a second processing unit having a second storage device, and a network connecting the first processing unit to the second processing unit, the first processing unit comprising:

a physical device driver for transferring data to and from the first storage device; and a distributed data module for transferring a copy of said data between the first processing unit and the second storage device across the network without the knowledge of the first processing unit, wherein said distributed data module includes:

a distributed storage module for encapsulating said copy of said data into a first protocol data unit;

a transport module for encapsulating said first protocol data unit into a second protocol data unit; and a network device driver for transferring said second protocol unit across the network to the second processing unit;

wherein the computer system includes a volume management module for passing said copy of said data to said distributed storage module, said volume management module includes means for allocating a buffer for said copy of said data, and said transport module includes means for releasing said buffer after said network device driver transfers said second protocol unit across the network.

2. The computer system of claim 1, wherein:

said network device driver includes means for transferring a plurality of second protocol units across the network to the second processing unit in a predetermined sequence, and the second processing unit includes means for processing said plurality of second protocol units according to said predetermined sequence.

3. The computer system of claim 1, wherein the second processing unit includes:

a plurality of daemon processes for transferring said copy of said data to a volume management module which transfers said data to and from the second storage device.

4. The computer system of claim 1, wherein said data is RAID state information.

5. The computer system of claim 1, wherein said data is I/O request data.

6. The computer system of claim 1, wherein:

the first processing unit includes a first operating system, the second processing unit includes a second operating system, and said first operating system is different from said second operating system.

7. A computer system comprising:

a first processing unit having a first storage device associated therewith;

a second processing unit having a second storage device associated therewith;

a network connecting said first processing unit to said second processing unit;

a first physical device driver for transferring first data between said first processing unit and said first storage device;

means for transparently transferring said first data between said first processing unit and said second storage device across said network without the knowledge of said first processing unit;

a second physical device driver for transferring second data between said second processing unit and said second storage device; and means for transparently transferring said second data between said second processing unit and said first storage device across said network without the knowledge of said second processing unit;

wherein said means for transparently transferring said first data includes a first distributed storage module for encapsulating said first data into a first protocol data unit, a first transport module for encapsulating said first protocol data unit into a second protocol data unit, and a first network device driver for transferring said second protocol unit across said network to said second processing unit, wherein said means for transparently transferring said second data includes a second distributed storage module for encapsulating said second data into a third protocol data unit, a second transport module for encapsulating said third protocol data unit into a fourth protocol data unit, and a second network device driver for transferring said fourth protocol data unit across said network to said first processing unit; and wherein said first distributed storage module includes means for passing said second data to and from said first physical device driver, and said second distributed storage module includes means for passing said first data to and from said second physical device driver.

8. The computer system of claim 7, wherein:

said means for passing said second data to and from said first physical device driver includes a first plurality of daemon processes, and said means for passing said first data to and from said second physical device driver includes a second plurality of daemon processes.

9. The computer system of claim 7, wherein:

said second distributed storage module further includes means for grouping together a plurality of first data acknowledgment packets together for transfer across said network to said first processing unit, and said first distributed storage module further includes means for grouping together a plurality of second data acknowledgment packets together for transfer across said network to said second processing unit.

10. The computer system of claim 7, wherein:

said first distributed storage module includes means for allocating a buffer for said first data, and said first transport module includes means for releasing said buffer after said network device driver transfers said first data across the network.

11. The computer system of claim 7, wherein said first data is stored on a boot disk of said first processing unit.

12. A computer system comprising:

a first processing unit having a first storage device associated therewith;

a second processing unit having a second storage device associated therewith;

a network connecting said first processing unit to said second processing unit;

a first physical device driver for transferring first data between said first processing unit and said first storage device;

means for transparently transferring said first data between said first processing unit and said second storage device across said network without the knowledge of said first processing unit;

a second physical device driver for transferring second data between said second processing unit and said second storage device; and means for transparently transferring said second data between said second processing unit and said first storage device across said network without the knowledge of said second processing unit;

wherein said means for transparently transferring said first data includes a first distributed storage module for encapsulating said first data into a first protocol data unit, a first transport module for encapsulating said first protocol data unit into a second protocol data unit, and a first network device driver for transferring said second protocol unit across said network to said second processing unit, wherein said means for transparently transferring said second data includes a second distributed storage module for encapsulating said second data into a third protocol data unit, a second transport module for encapsulating said third protocol data unit into a fourth protocol data unit, and a second network device driver for transferring said fourth protocol data unit across said network to said first processing unit; and wherein said first processing unit includes a volume management module for passing said first data to said distributed storage module, said volume management module includes means for allocating a buffer for said first data, and said first transport module includes means for releasing said buffer after said first network device driver transfers said second protocol unit across said network.

13. A computer system comprising:

a local processing unit having a first operating system executing thereon;

a storage device for storing data;

a physical device driver for facilitating the transfer of said data between said local processing unit and said storage device; and a distributed data module transparently interfaced to said operating system and said physical device driver for replicating said data across a network to a remote processing unit, wherein said distributed data module includes:

a distributed storage module for receiving said data and encapsulating said data into a first protocol data unit;

a transport module for receiving said first protocol data unit and encapsulating said first protocol data unit into a second protocol data unit;

a network device driver for transferring said second protocol unit across said network to said remote processing unit; and wherein the computer system includes a volume management module for passing a copy of said data to said distributed storage module, said volume management module includes means for allocating a buffer for said copy of said data, and said transport module includes means for releasing said buffer after said network device driver transfers said second protocol unit across said network.

14. The computer system of claim 13, wherein said distributed data module replicates said data across said network to a plurality of remote processing units.

15. A computer system including a first processing unit having a first storage device and a first operating system, a second processing unit having a second storage device and a second operating system which is different than the first operating system, and a network connecting the first processing unit to the second processing unit, the first processing unit comprising:

a physical device driver for transferring data to and from the first storage device; and a distributed data module for transferring a copy of said data between the first processing unit and the second storage device across the network without the knowledge of the first processing unit, wherein said distributed data module includes:

a distributed storage module for encapsulating said copy of said data into a first protocol data unit;

a transport module for encapsulating said first protocol data unit into a second protocol data unit; and a network device driver for transferring said second protocol unit across the network to the second processing unit.

16. The computer system of claim 15 wherein:

said distributed storage module includes means for allocating a buffer for said copy of said data, and said transport module includes means for releasing said buffer after said network device driver transfers said second protocol unit across the network.

17. The computer system of claim 15, wherein said data is I/O request data.

18. The computer system of claim 15 wherein said network device driver includes means for transferring a plurality of second protocol units across the network to the second processing unit in a predetermined sequence, and the second processing unit includes means for processing said plurality of second protocol units according to said predetermined sequence.

19. The computer system of claim 15, wherein the second processing unit includes:

a plurality of daemon processes for transferring said copy of said data to a volume management module which transfers said data to and from the second storage device.

20. A computer system comprising:

a first processing unit having a first storage device and a first operating system associated therewith;

a second processing unit having a second storage device and a second operating system which is different than said first operating system associated therewith;

a network connecting said first processing unit to said second processing unit;

a first physical device driver for transferring first data between said first processing unit and said first storage device;

a second physical device driver for transferring second data between said second processing unit and said second storage device;

means for transparently transferring said first data between said first processing unit and said second storage device across said network without the knowledge of said first processing unit, said means for transparently transferring said first data including a first distributed storage module including means for passing said second data to and from said first physical device driver; and means for transparently transferring said second data between said second processing unit and said first storage device across said network without the knowledge of said second processing unit, said means for transparently transferring said second data including a second distributed storage module including means for passing said first data to and from said second physical device driver.

* * * * *